United States Patent [19]
Kozaki et al.

[11] Patent Number: 6,098,003
[45] Date of Patent: Aug. 1, 2000

[54] CONTROL APPARATUS AND METHOD FOR AUTOMATIC TRANSMISSION

[75] Inventors: Tetsuji Kozaki, Chita-gun; Hiroshi Enomoto, Obu, both of Japan

[73] Assignee: Denso Corporation, Kariya, Japan

[21] Appl. No.: 09/172,682

[22] Filed: Oct. 15, 1998

[30] Foreign Application Priority Data

Oct. 16, 1997 [JP] Japan .................................. 9-283696

[51] Int. Cl.[7] .................................................. B60K 41/08
[52] U.S. Cl. ........................... 701/51; 701/60; 701/61; 701/62
[58] Field of Search ............................. 701/60, 61, 62, 701/51

[56] References Cited

U.S. PATENT DOCUMENTS

| | | | |
|---|---|---|---|
| 5,046,383 | 9/1991 | Butts et al. | 74/862 |
| 5,207,122 | 5/1993 | Minagawa | 74/866 |
| 5,382,201 | 1/1995 | Iizuka | 475/123 |
| 5,403,245 | 4/1995 | Watanabe et al. | 477/54 |
| 5,445,577 | 8/1995 | Fujita et al. | 477/120 |
| 5,762,581 | 6/1998 | Kozaki et al. | 477/174 |
| 5,772,550 | 6/1998 | Kamada et al. | |
| 5,785,628 | 7/1998 | Kamada et al. | |
| 5,790,967 | 8/1998 | Kull et al. | 701/51 |
| 5,848,370 | 12/1998 | Kozaki et al. | 701/51 |

FOREIGN PATENT DOCUMENTS

| | | |
|---|---|---|
| 2-80853 | 3/1990 | Japan . |
| 8-270780 | 10/1996 | Japan . |
| 8-326885 | 12/1996 | Japan . |
| 8-334170 | 12/1996 | Japan . |

*Primary Examiner*—William A. Cuchlinski, Jr.
*Assistant Examiner*—Olga Hernandez
*Attorney, Agent, or Firm*—Pillsbury Madison & Sutro LLP

[57] ABSTRACT

A control apparatus and method for an automatic transmission that prevents incorrect determination of the start of a gear change inertia phase caused by bounding of an input shaft speed, and that prevents delay of the detection of the start of the inertia phase. A working fluid pressure of the frictional element is feedback-controlled in an inertia phase of a gear change transition of a speed-changing gear mechanism, wherein the input shaft speed of the mechanism changes along with an engaging operation of a frictional element of the mechanism. When it is determined that a starting point for the inertia phase control has been reached, inertia phase control is initiated. After a predetermined determination interval subsequently elapses, it is determined whether the inertia phase control should continue.

17 Claims, 13 Drawing Sheets

CONTROL APPARATUS AND METHOD FOR AUTOMATIC TRANSMISSION

CROSS-REFERENCE TO RELATED APPLICATION

The present application is related to and claims priority in Japanese unexamined patent application Hei. 9-283696, the contents of which are incorporated herein by reference.

BACKGROUND OF THE INVENTION

1. Field of the Invention

The present invention relates generally to transmission controls, and more particularly to an inertial phase fluid pressure control apparatus and method for an automatic transmission.

2. Description of Related Art

Generally, a vehicle automatic transmission includes both a torque converter and a speed-changing gear mechanism. The transmission automatically changes among predetermined gears via a speed-changing gear mechanism power transmission path that is switched by selective operation of a number of friction elements such as clutches and brakes.

Such an automatic transmission includes a hydraulic pressure controller for controlling the charge and discharge of working fluid to and from the frictional elements. During gear shifting operations, a smooth transition is realized through precise control of the charge and discharge of working fluid by the hydraulic pressure controller.

For example, to reduce shift shock in the inertia phase of the gear-changing transition, feedback control is performed to cause the input shaft speed of the speed-changing gear mechanism to trace a target value during the inertia phase period. To reduce inertia torque, which is caused by shift shock, torque-reducing control of the engine is executed.

Because it is preferable for such feedback control and torque-reducing control to be executed from the start of the inertia phase, the detection of the starting time of the inertia phase is necessary when these controls are to be executed.

For this detection of the start of the inertia phase, a method is used that takes into account any acceleration of the vehicle, using the input shaft speed Nt, the output shaft speed No and the gear ratio before the gear change gr, by calculating F from the following Exp. (1), and when $F \geq 0$ this is taken as the start of the inertia phase.

$$No \cdot gr - Nt = F \qquad (1)$$

More particularly, considering variation of speed signal detection values and the influence of noise, a method is utilized wherein the start of the inertia phase occurs when $F \geq \Delta n$ ($\Delta n$ being a predetermined determination value), that is, when the following Exp. (2) is satisfied.

$$No \cdot gr - Nt \geq \Delta n \qquad (2)$$

For example, Japanese Unexamined Patent Publication No. H.1-266025 relates to a technology wherein the start of the inertia phase is detected by the above method and torque-reducing control of the engine is started on establishment of the condition in Exp. (2).

According to Japanese Unexamined Patent Publication No. H.2-80853, on the other hand, starting feedback control immediately after the establishment of Exp. (2) is undesirable from the viewpoint of the rotation behavior of the input shaft. It is preferable for feedback control to be started after a delay of a predetermined time, or after the gradient of the decrease of the input shaft speed reaches a predetermined value. In Japanese Unexamined Patent Publication No. H.8-270780, this determination value of the decrease gradient of the input shaft speed is set according to the size of the input torque at the time of the gear change.

However, in carrying out research into automatic transmission control, with the kind of method described above, the present inventors have encountered conditions such that the start of the inertia phase, i.e. the starting point for feedback control and torque-reducing control, cannot be reliably detected.

That is, as shown in FIG. 17, before the start of the inertia phase, there is a phenomenon of the input shaft speed Nt bounding. By carrying out research into this phenomenon it was ascertained that the phenomenon of the input shaft speed Nt bounding occurs under the following two conditions (with the following causes) [1] and [2].

[1] Referring to FIGS. 17A and 17B, the first condition is a result of coefficient of friction characteristics of friction elements.

As shown in FIG. 17B, the friction element generally has the property that its coefficient of friction temporarily assumes a large value when the clutch initially engages. Because of this, in the initial stage of shifting, the frictional force temporarily assumes a large value. Consequently, the gear change proceeds and the input shaft speed Nt temporarily starts to fall (a fall in the torque phase) as shown in FIG. 17A. However, because at this time the hydraulic pressure is still not sufficiently high, when the coefficient of friction subsequently decreases to its essential level, it cannot maintain an engagement force sufficient to continue the gear change, and the input shaft speed Nt rises again due to torque applied by the engine. After that, as the clutch hydraulic pressure rises, the real gear change begins. As a result, the input shaft speed Nt truly falls.

[2] Referring to FIG. 17C, the second condition occurs in gear changes in vehicles with one-way clutches, when the accelerator is depressed but then minimally returned so that a shifting line is crossed.

At this time, as shown in FIG. 17C, first, as a result of an engine braking effect caused by the accelerator being returned, the input shaft speed Nt temporarily falls. Then, the one-way clutch ceases to transmit the load torque from the vehicle side (the output shaft torque). As a result, the inertia acting on the input shaft falls. Consequently, the falling of the input shaft speed Nt stops or the input shaft speed Nt rises slightly. Thereafter, progress of the real shifting causes the input shaft speed Nt to fall.

When a bound occurs in the input shaft speed Nt due to the cause described above, the start of the inertia phase is determined on the basis of Exp. (2). For example, as illustrated in FIG. 17A, at the first fall in the input shaft speed Nt (see "A" in the figure), it is mistakenly determined that the inertia phase has started.

Consequently, when feedback control and torque-reducing control are initiated, because the state of the engaging (or oncoming) clutch is still at the end of the torque phase, and shifting has not proceeded to the inertia phase, the movement of the input shaft speed Nt cannot be properly adjusted by hydraulic pressure control. Also, because an inertia torque has not developed, when torque-reducing control is executed, a large shift shock occurs.

As a method of preventing the above type of erroneous detection, the determination value ($\Delta n$) of the above-mentioned Exp. (2) for detecting the inertia phase may be set to a sufficiently large value. However, with this method the detection of the starting time of the inertia phase is delayed, and the starting point of inertia phase control is therefore delayed. Consequently, it is not possible to realize a sufficient reduction in shift shock.

Also, when the method of detecting the decrease gradient of the input shaft speed Nt is utilized, because the affect of acceleration of the vehicle is not reflected in the detection, the detection of the start point of the inertia phase is also delayed.

SUMMARY OF THE INVENTION

It is therefore an object of the present invention to provide a control apparatus, a control method and a storing medium of an automatic transmission with which it is possible to prevent incorrect determination of the start of an inertia phase caused by bounding of the input shaft speed and to prevent delay of the detection of the start of the inertia phase.

According to the present invention, an automatic transmission control apparatus executes an inertia phase control to feedback-control a working fluid pressure of a frictional element of a speed-changing gear mechanism, wherein the input shaft speed of the speed-changing gear mechanism changes along with an engaging operation of the frictional element. When it is determined that a starting point for the inertia phase control has been reached, inertia phase control is started. After a predetermined determination interval from when the inertia phase control is started, it is determined whether the inertia phase control is to continue.

Determination of whether the inertia phase control is to continue may be based on one of several factors, depending upon the particular embodiment of the present invention that is utilized. For example, such determination may be based on (1) a difference between a target input shaft speed and the actual input shaft speed; (2) a difference between a target input shaft speed gradient and an actual input shaft speed gradient; (3) a value of the input shaft speed based on ideal progression of the inertia phase control; or (4) a determination of whether an actual input shaft speed gradient has reached a predetermined value.

According to the present invention, inertia phase control is not simply executed from when the starting point for the inertia phase control is determined. Rather, a determination on whether or not to continue the inertia phase control is executed after a predetermined determination interval from the start of the inertia phase control Thus, even when the starting point of the inertia phase control has been erroneously determined due to the bounding phenomenon described above, whether or not that determination was correct can be reassessed after a predetermined determination interval. As a result, because inertia phase control started on the basis of an erroneous determination can be suspended, it is possible to prevent shift shock caused by improper inertia phase control.

Also, it is not necessary to use an excessive determination value to prevent incorrect determinations due to the bounding phenomenon as in the related art, as an accurate starting point for inertia phase control can be detected. Therefore there is no lagging of the start of inertia phase control.

DETAILED DESCRIPTION OF THE PREFERRED EMBODIMENTS

Preferred embodiments of an automatic transmission control apparatus according to the invention will now be described in detail.

First Preferred Embodiment a) First, the construction of a first preferred embodiment of an automatic transmission control apparatus of the present invention will be described.

Figure 1:
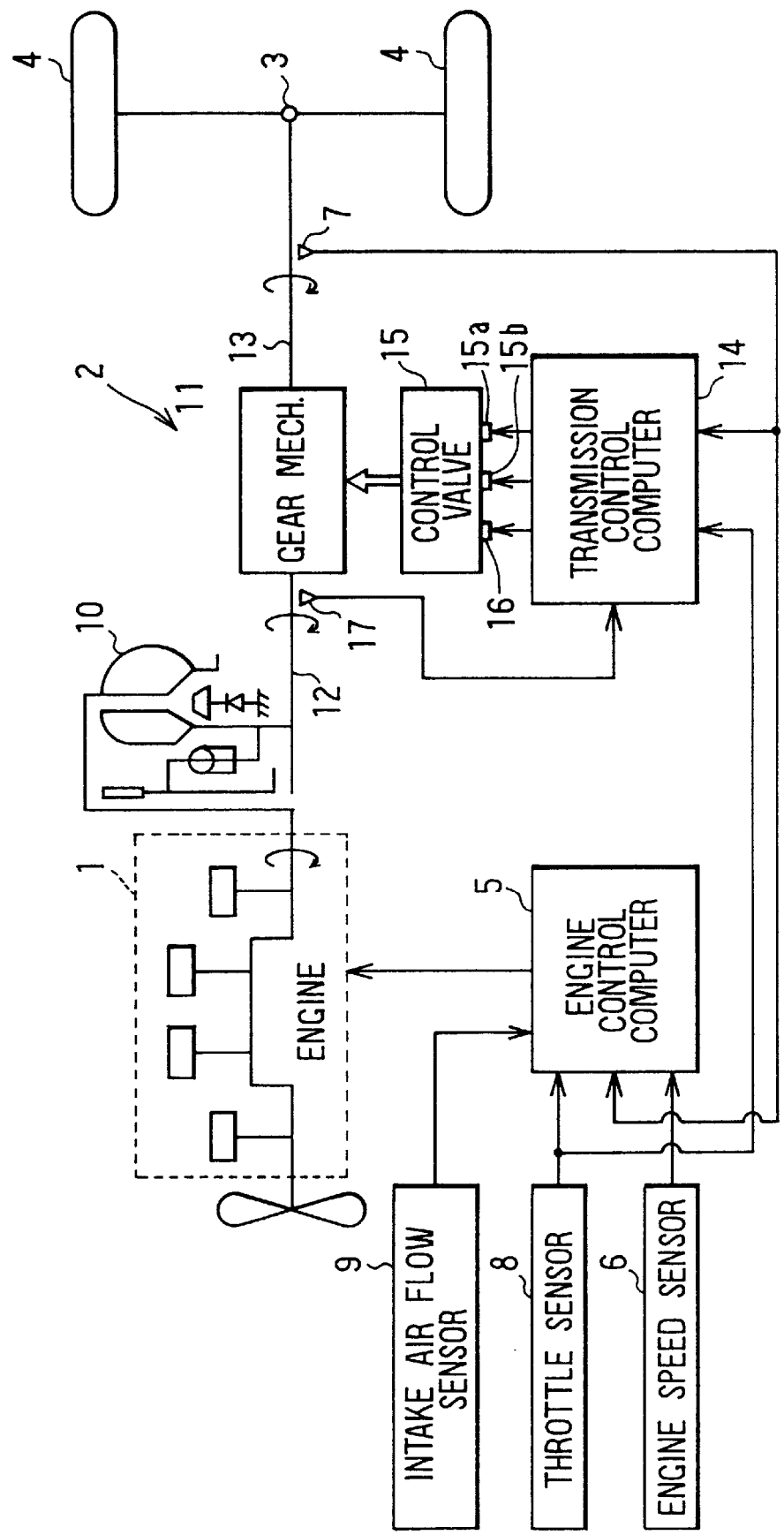
FIG. 1 is a schematic view showing the overall construction of an automatic transmission control system of a first preferred embodiment of the present invention.

As shown in FIG. 1, an electronically controlled motor vehicle engine 1 is connected to wheels 4 by way of an automatic transmission 2 and a differential 3.

The engine 1 has an engine control computer 5, into which signals are input from an engine speed sensor 6 for detecting the speed of the engine, a vehicle speed sensor 7 for detecting the speed of the car (the output shaft speed of the automatic transmission 2), a throttle sensor 8 for detecting the throttle angle of the engine 1, and an intake air flow sensor 9 for detecting the flow of intake air into the engine.

The engine control computer 5 determines fuel injection quantities and issues commands to the engine 1 on the basis of the input information, and although not illustrated in the drawings, it also supplies an ignition signal to the engine 1. Thus, a fuel supply device and an ignition device (not shown) operate, and fuel injection and combustion are effected in synchrony with rotation of the engine 1, and control of the engine 1 is executed.

The automatic transmission 2 has a torque converter 10 and a speed-changing gear mechanism 11, and power supplied to it from the engine 1 is transmitted via an engine output shaft 1a (see FIG. 2) and the torque converter 10 to an input shaft 12 of the speed-changing gear mechanism 11. This rotational power transmitted to the input shaft 12 is varied, depending on the selected gear position of the speed-changing gear mechanism 11, and transmitted to an output shaft 13. From this output shaft 13, power is transmitted via the differential 3 to the wheels 4 to propel the car.

Figure 2:
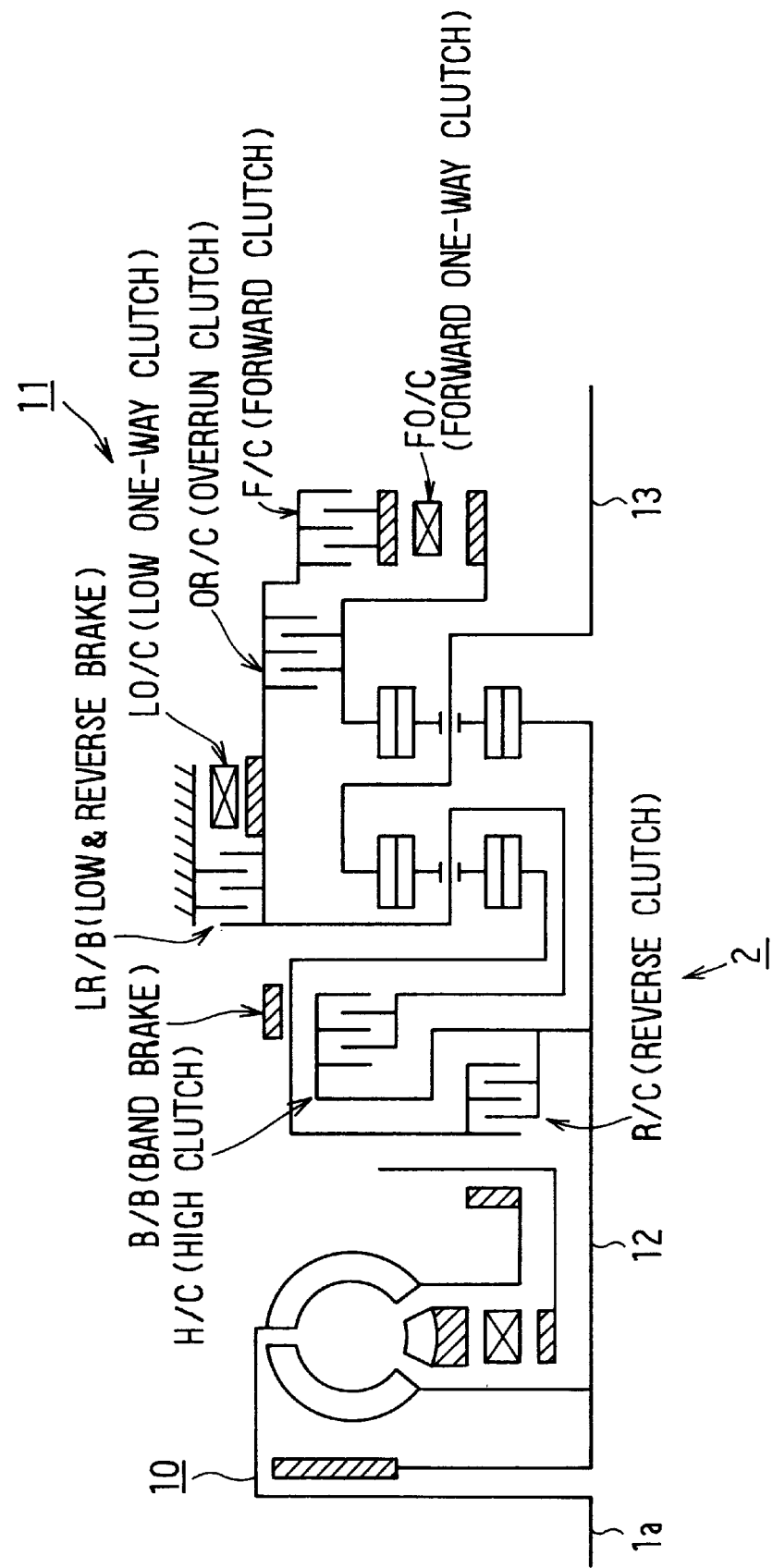
FIG. 2 is a schematic view showing the construction of an automatic transmission.

The automatic transmission 2 is of conventional design, as shown in FIG. 2, and therefore will not be described in detail, except that the speed-changing gear mechanism 11 has various frictional elements such as clutches (R/C, H/C, LO/C, OR/C, F/C, FO/C) and brakes (B/B, LR/B) for engaging different power transmission paths from the input shaft 12 to the output shaft 13.

As shown in FIG. 1, a control valve 15 driven based on commands from a transmission control computer 14 is connected to the speed-changing gear mechanism 11; hydraulic pressure is supplied from the control valve 15 to the speed-changing gear mechanism 11, and gear changes are realized by causing the hydraulic pressure to act on the frictional elements.

The control valve 15 is provided with two gear change control solenoids 15a, 15b for switching among paths for supplying hydraulic pressure for each gear respectively and a line pressure control solenoid 16 for controlling the magnitude of the hydraulic pressure on commands from the transmission control computer 14.

Although in the present embodiment two gear change control solenoids 15a, 15b are used, the number of gear change solenoids may be increased in accordance with the number of gear positions of the speed-changing gear mechanism 11 and the internal construction of the control valve 15. Also, a solenoid for adjusting timing for rapid charging and discharging of hydraulic fluid during gear change transitions may be added. And, although in the present embodiment the line pressure control solenoid 16 will be taken to be a duty solenoid, other means for varying hydraulic pressure, such as a linear solenoid, may be used.

The transmission control computer 14 is preferably a conventional microcomputer, and receives input signals from the vehicle speed sensor 7, the throttle sensor 8, and an input shaft speed sensor 17 measuring the speed of the input shaft 12.

Also, the engine control computer 5 and the transmission control computer 14 are connected by a communication line 18, whereby control information and commands can be exchanged in both directions. This communication line 18 may be a multiplex communication mechanism such as a LAN (Local Area Network) or wires connecting I/O ports of the control computers for each necessary type of communication.

b) Next, content of control executed by the engine control computer 5 and the transmission control computer 14 in this preferred embodiment will be described. The control processing shown below is repeated at intervals of a fixed period (for example 8 to 25 msec).

Figure 3:
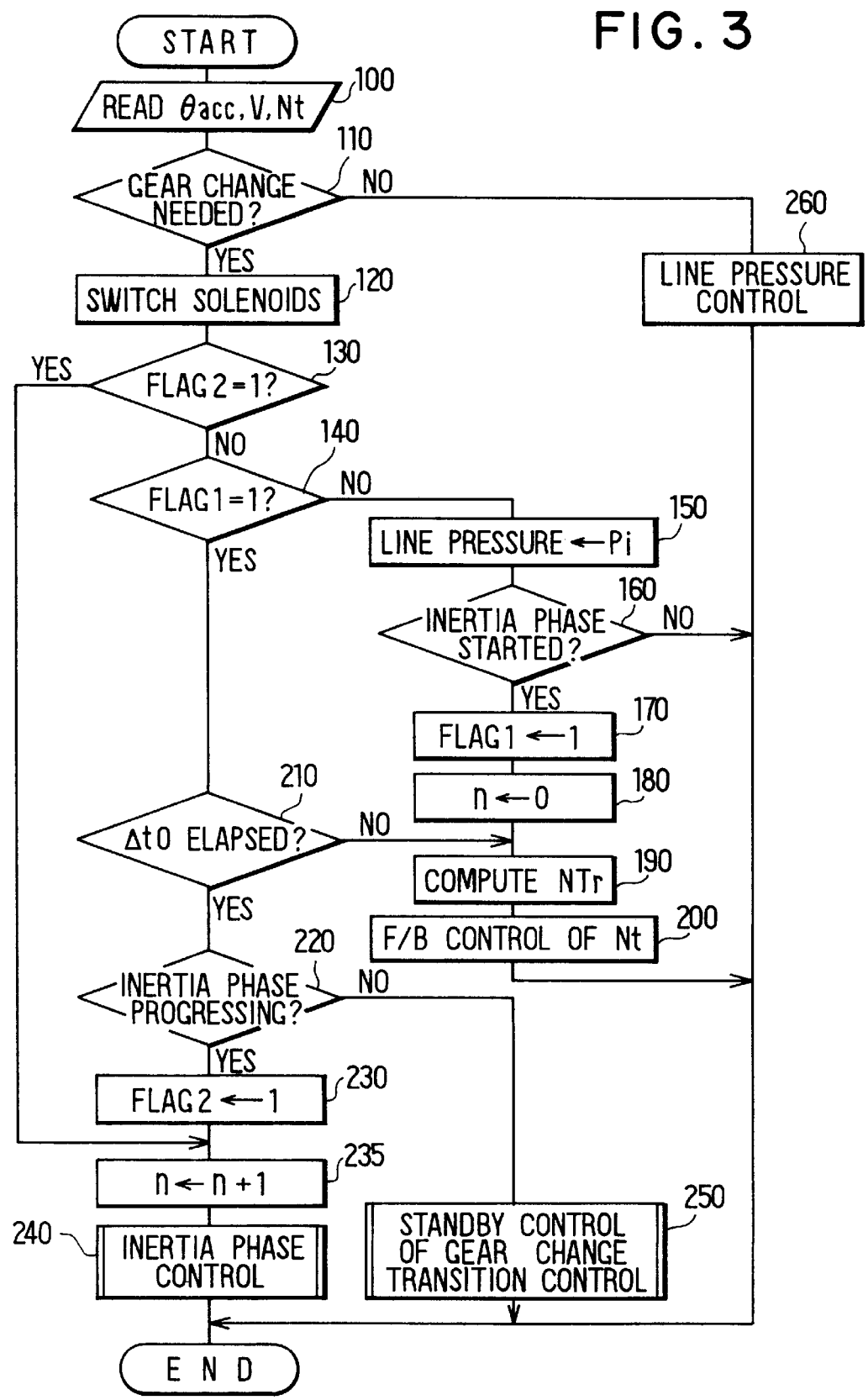
FIG. 3 is a flow diagram of a main routine of control processing of the first preferred embodiment.
Figure 4:
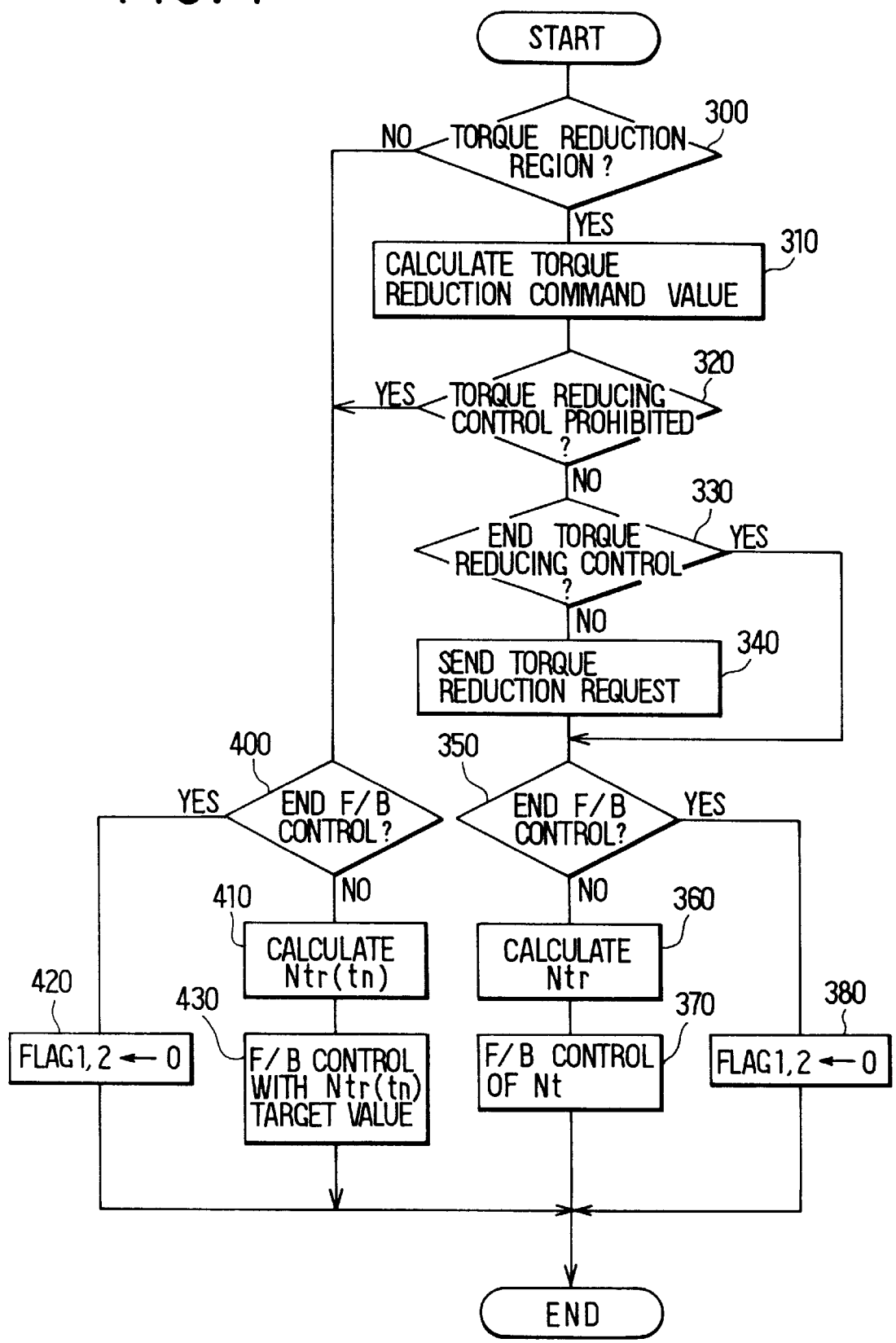
FIG. 4 is a flow diagram showing control processing of the first preferred embodiment executed during inertia phase progression.
Figure 5:
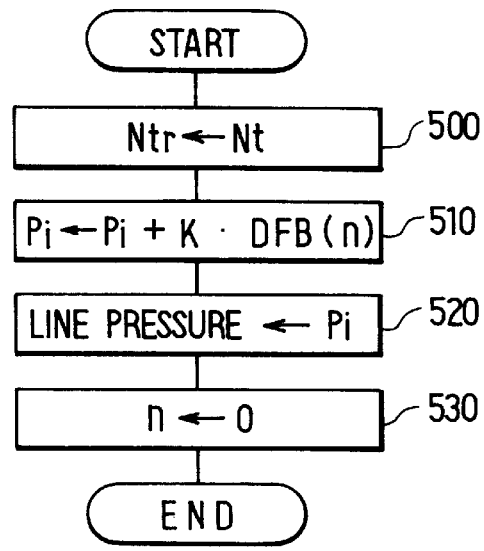
FIG. 5 is a flow diagram showing standby control processing of the first preferred embodiment executed during shifting transition.
Figure 6:
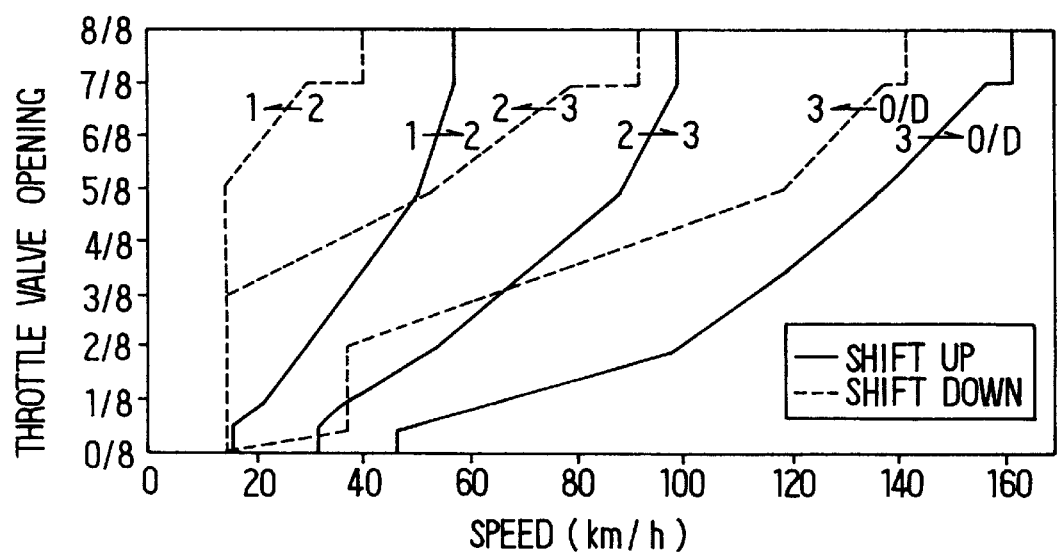
FIG. 6 is a schedule of vehicle operating conditions that determine where upshifts and downshifts are commanded in an electronically-controlled automatic transmission.

(i) First, gear changing control executed by the transmission control computer 14 will be described on the basis of the flow diagrams of FIGS. 3–5 and the explanatory views of FIGS. 6–8. FIG. 3 shows a main routine of control of this preferred embodiment, FIG. 4 shows control executed during progression of an inertia phase, and FIG. 5 shows standby control executed during a shifting transition.

[1] First, the main control routine will be described.

As shown in FIG. 3, in the transmission control computer 14, at step 100, the throttle angle $\Theta acc$, the vehicle speed V and the input shaft speed Nt are read.

Then, at step 110, it is determined whether there is a need for a shift based on a shift schedule chart.

A map having vehicle speed and throttle angle as parameters is pre-stored in the transmission control computer 14 as the shift schedule chart. This map, as shown in FIG. 6, is made up of gear changes from nth speeds (n=1, 2, 3) to n+1th speeds (upshifts) and gear changes from mth speeds (m=1, 2, 3) to m−1th speeds (downshifts), using determination lines differing as indicated by the upshifts indicated with solid lines and the downshifts indicated with dashed lines, to prevent chattering when a gear change is implemented.

The transmission control computer 14, using this shift schedule chart, determines that a gear change is needed when a line connecting the vehicle speed—throttle angle point in the previous computation with that point in the present computation crosses a solid or dashed shifting line.

Then, at step 110, if it was determined that a gear change is needed, at step 120, the transmission control computer 14 switches the ON/OFF states of the gear change control solenoids 15a and 15b to correspond to a new gear position obtained from the shift schedule chart.

The ON/OFF states of the gear change control solenoids 15a and 15b are controlled, for example, as shown in Table 1 below. These relationships also are pre-stored in the transmission control computer 14.

TABLE 1

| gear # | gear change control solenoid 15a | gear change control solenoid 15b |
|---|---|---|
| 1 | ON | OFF |
| 2 | ON | ON |
| 3 | OFF | ON |
| 4 | OFF | OFF |

When the ON/OFF states of the gear change control solenoids 15a and 15b are switched to correspond to a new gear position as indicated, the hydraulic pressures applied to the frictional elements inside the speed-changing gear mechanism 11 are changed by way of the control valve 15, the necessary clutches and/or brakes are operated, and the gear is thereby switched.

Next, at step 130, it is determined whether or not a flag Flag 2 showing that an actual inertia phase is progressing has been set to 1. When a positive determination is made, processing proceeds to step 235. When a negative determination is made, processing proceeds to step 140.

At step 140, it is determined whether or not a flag Flag 1 showing that an inertia phase has started has been set to 1. If a positive determination is made, then processing proceeds to step 210. If a negative determination is made processing proceeds to step 150.

The flags Flag 1 and Flag 2 are preset to zero by initialization processing executed when the power supply to the transmission control computer 14 is first switched on.

At step 150, the drive duty of the line pressure control solenoid 16 is controlled and the line pressure is thereby set to an initial pressure Pi for shifting.

Figure 7:
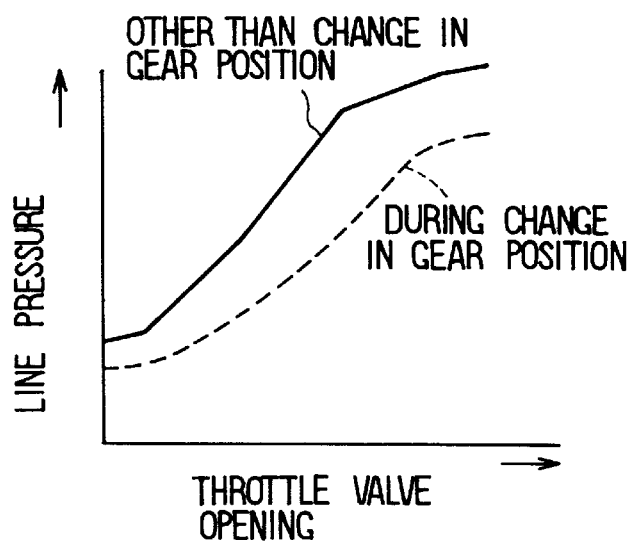
FIG. 7 is a view illustrating a map for obtaining a line pressure from a throttle angle.

This initial pressure Pi, for example as shown in FIG. 7, is obtained in advance as a function of throttle angle on a map, and this is stored in the transmission control computer 14. In this preferred embodiment, two relationships, one for use during shifting, shown with a dashed line, and one for use at times other than during shifting, shown with a solid line, are stored. Also, a map expressing a relationship between line pressure and drive duty to the solenoid 16 as shown in FIG. 8 is also stored in the transmission control computer 14. By using these two maps the transmission control computer 14 obtains an initial pressure Pi from the throttle angle at the time of the shifting, further obtains a drive duty for maintaining this Pi, and controls the drive duty of the line pressure control solenoid 16 accordingly.

Figure 8:
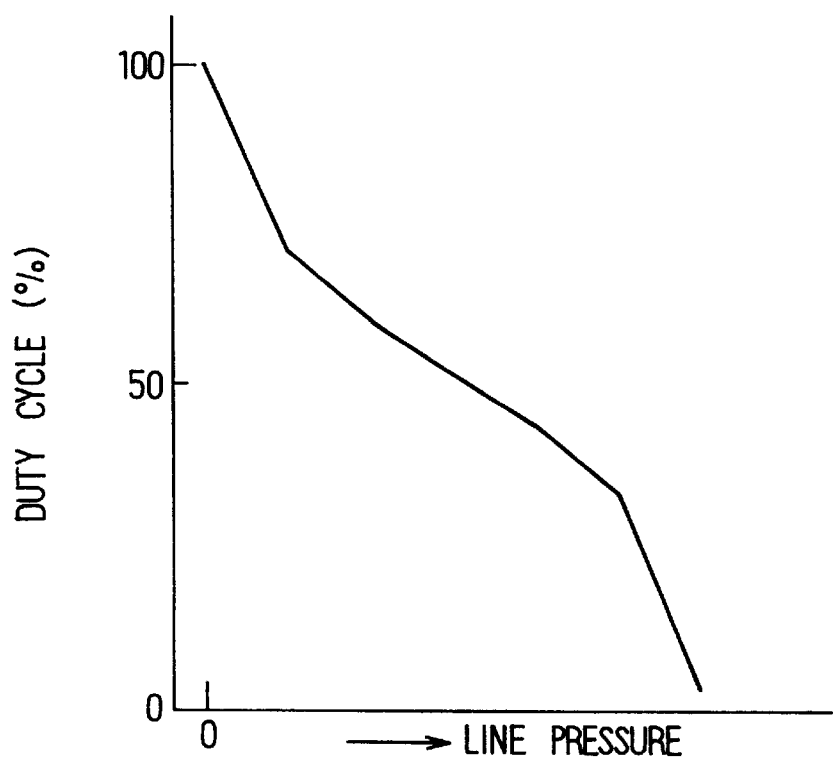
FIG. 8 is a view illustrating a map for obtaining a duty value from a line pressure.

In this embodiment the two maps shown in FIG. 7 and FIG. 8 are used. However, these may alternatively be integrated so that a duty value can be found directly from a throttle angle.

When the line pressure has thus been set to an initial pressure Pi, next, at step 160, it is determined whether or not the inertia phase has started, that is, whether or not a starting condition of feedback control (F/B control) of the line pressure, which is inertia phase control, has been satisfied. This feedback control is controlling hydraulic pressure (the line pressure) making the actual input shaft speed Nt follow up a target input shaft speed Ntr set to make the inertia phase end within a predetermined time.

When the frictional elements corresponding to the new gear position begin to transmit torque the input shaft speed Nt starts to fall, and the determination of the starting condition of this feedback control is executed by detecting the fall in the input shaft speed Nt. Accordingly, the starting condition is for example determined using the following Exp. (2).

$$No \cdot gr - Nt \geq \Delta n \quad (2)$$

where Nt is the input shaft speed, No is the output shaft speed, gr is the gear ratio before the shifting and Δn is a determination value.

Until the feedback control starting condition of Exp. (2) is satisfied, at step 150, the line pressure continues to be maintained at Pi.

Then, when it is determined from Exp. (2) that the inertia phase is starting, that is, that the starting point for inertia phase control has been reached, at step 170, Flag 1 is set to 1 to show the start of inertia phase control.

Subsequently, at step 180, a counter n showing a computation period is set to 0 (tn becomes t0). At step 190, computation of a target value of the input shaft speed (a target input shaft speed) Ntr for performing feedback control, which is inertia phase control, is executed.

Specifically, an input shaft speed change width ΔNtr is calculated from the present input shaft speed Nt, and the relationship between the gear ratios of before and after the shifting. This value is then divided by a target time Tt determined by the heat capacities of the frictional elements and engine characteristics and so on to obtain the value of a gradient of a target locus. Then, the change Δntr in the input shaft speed over one computation period is calculated from this gradient value, and a target value Ntr(tn) is obtained from the following Exp. (3).

$$Ntr(tn) = Ntr(tn-1) - \Delta ntr \quad (3)$$

where Ntr(tn−1) is the target value before one computation period and at n=0 Ntr(t0) is made Nt(t0).

When the target input shaft speed Ntr(tn) has been obtained in this way, next, at step 200, feedback control of the input shaft speed Nt is executed.

That is, when Nt<Ntr(tn) the line pressure is reduced and the progress of the gear change is thereby suppressed so that Nt approaches Ntr(tn). When Nt>Ntr(tn) the line pressure is increased so that Nt approaches Ntr(tn). The object of this control is the line pressure control solenoid 16.

Specifically, control is executed by a known feedback operation based on a deviation obtained using the target input shaft speed Ntr and the actual input shaft speed Nt, namely ΔNt=Ntr(tn)−Nt(tn). For example, with PID control, a feedback compensation hydraulic pressure DFB(tn) is calculated using the following Exp. (4).

$$DFB(t0) = k(Kp \cdot \Delta Nt(tn) + K_i \sum_{i=0}^{n} Nt(ti) + Kd(\Delta Nt(tn) - \Delta Nt(tn-1))) \quad (4)$$

where tn shows the present input and output state and tn−1 shows the state one computation period earlier. Kp, Ki and Kd denote gains of a P term (proportional term), an I term (integral term) and a D term (differential term) in PID control, and k is a gain reduction coefficient having a value selected in accordance with engine characteristics. For example, a value in the range of 0 (zero) to about ½ may be selected and preset.

This feedback computation may alternatively consist of PD, PI or P alone, or may be an alternative control theory. Although in this preferred embodiment only one gain reduction coefficient is set, a gain reduction kp, ki, kd may alternatively be set for each of the control elements, to make finer adjustment possible.

Processing proceeds to step 210 when Flag 1=1. Because inertia phase control has started, it is determined whether or not a determination interval Δt0 has elapsed since the inertia phase started. When a positive determination is made, processing proceeds to step 220. When on the other hand a negative determination is made, processing proceeds to the above-mentioned steps 190 and 200, and feedback control is continued.

The determination interval Δt0 is a standby interval for checking the state of progression of the inertia phase after the determination of the start of the inertia phase is made.

At step 220 it is determined whether or not the inertia phase is progressing. When a positive determination is made, processing proceeds to step 230. When a negative determination is made, processing proceeds to step 250.

The inertia phase is determined to be progressing when the following Exp. (5) is satisfied.

$$Nt - Ntr \leq \Delta N \quad (5)$$

where ΔN is a determination value.

In other words, because feedback control in the inertia phase is already being implemented, if the previous inertia phase determination was correct and therefore the inertia phase is actually presently in progress, the difference between the actual input shaft speed Nt and the target input shaft speed Ntr can be expected to be less than a predetermined determination value ΔN. Therefore, when Exp. (5) is satisfied, feedback control is appropriate; that is, that the inertia phase is progressing.

At step 230, because the inertia phase is progressing, Flag 2 is set to 1. Processing then proceeds to step 235 and increments the value of the counter n.

At step 240, control during the inertia phase, which will be discussed in detail later with reference to FIG. 4, is executed, after which the present processing is ended.

When it is determined at step 220 that an inertia phase is not progressing and processing proceeds to step 250, standby control of gear change transition control, which will be discussed in detail later with reference to FIG. 5, is executed, and the present processing is then ended.

When at step 110 it is not found that a gear change is needed, at step 260 a line pressure is obtained from the solid line relationship of the map in FIG. 7 and converted into a drive duty using the map of FIG. 8, and the line pressure control solenoid 16 is controlled at this duty. As a result, line pressure control to maintain a predetermined line pressure matched to the throttle angle for times other than gear changes is executed. In this case the ON/OFF states of the gear change control solenoids 15a, 15b are maintained.

[2] Next, control for inertia phase progression at step 240 will be described with reference to FIG. 4.

This control processing is for executing torque-reducing control as necessary and for continuing or ending feedback control during progression of the inertia phase.

At step 300, to carry out torque-reducing control along with feedback control, it is first determined whether or not the engine is operating in a high output region in which torque reduction is necessary. This determination is executed according to whether or not the throttle angle is above 25%. Further, it is determined that the engine is in a region in which torque reduction is necessary when the throttle angle is above 25%.

When the engine is in the torque reduction region, at step 310, the transmission control computer 14 calculates a command value for torque-reducing control to be issued to the engine control computer 5. As this command value, as shown in Table 2 below, preset code values are set in correspondence with throttle angle. These relationships are stored in the transmission control computer 14. The code values respectively correspond one-to-one with the different contents of torque-reducing control shown in the table.

TABLE 2

| throttle angle | content of torque reduction control | command code |
|---|---|---|
| Θ < 25% | no torque reduction control | 0 |
| 25% Θ < 37.5% | ignition delay | 1 |
| 37.5% ≦ Θ < 50% | fuel to ½ of cylinders cut | 2 |
| 50% ≦ Θ | fuel to all of cylinders cut | 3 |

When a torque-reducing control command code is thus obtained at step 320, a check of whether or not torque-reducing control is prohibited is executed. This check is executed based on a torque reduction prohibition flag transmitted to the transmission control computer 14 from the engine control computer 5. The engine control computer 5 transmits information reporting a prohibition of torque reduction as a torque reduction prohibition flag at times such as during warm-up control and during fail-safe control, when torque reduction is impossible.

When it is determined that a torque reduction prohibition is not in effect, at step 330, it is determined whether or not it is time for torque-reducing control to be ended from the state of progress of the gear change. This timing is set in accordance with characteristics of the engine and the response speed of the torque-reducing control and so on depending on the time elapsed from the initiation of torque reduction, the value of the input shaft speed, and the degree of completion of the shifting indicated by the gear ratio during gear change transition.

When it is determined that the time for ending the torque-reducing control has not been reached, at step 340 a torque-reduction request is sent to the engine control computer 5 through the communication line 18. That is, the command code obtained at step 310 is transmitted to the engine control computer 5.

When gear change transition control has proceeded far enough, and it is determined that the timing for ending torque reduction has been passed, step 340 is bypassed.

Processing then proceeds to step 350, and it is determined whether or not to end feedback control according to a gear change end determination. When a positive determination is made, processing proceeds to step 380. When a negative determination is made, processing proceeds to step 360.

For the gear change end determination at step 350, in the case of an upshift, it is sufficient to detect the point at which the direction of change of the input shaft speed Nt reverses; that is, the point at which the input shaft speed stops decreasing due to the progression of the gear change and starts to increase again. Alternatively, the gear change end determination may be made when the difference between the input shaft speed and a value obtained by multiplying the vehicle speed by the gear ratio of the speed to which the gear shifting mechanism 11 is switching falls below a predetermined value (for example 50 rpm).

At step 360, a target input shaft speed Ntr for carrying out feedback control is calculated in the same way as in the processing of the above step 190 of FIG. 3.

At step 370, using the target input shaft speed Ntr(tn), feedback control of the input shaft speed Nt is executed as with the processing of the above-mentioned step 200 of FIG. 3. The present processing routine then ends.

When it is determined that feedback control is to be ended at step 350, Flag 1 and Flag 2 are reset (set to 0) at step 380, and the present processing routine ends.

Next, control is described that is executed when, in the above-mentioned step 300, it is determined that the engine is not in a torque reduction region, and when at step 320 it is determined that torque reduction is prohibited.

In these cases, processing proceeds to step 400, where it is determined whether or not to end feedback control. When feedback control is not to be ended, processing proceeds to step 410, and a target input shaft speed Ntr(tn) is calculated. At step 430, feedback control is executed with Ntr(tn) as a target value.

Here, the processing at step 410 is exactly the same as that at step 360.

However, as shown in Exp. (6) below, in the processing of step 430, a feedback compensation hydraulic pressure DFB(tn) is obtained using an expression not containing a gain reduction coefficient factor, which is slightly different from the above-mentioned step 370.

$$DFB(tn) = Kp \cdot \Delta Nt(tn) + K_i \sum_{i=0}^{n} \Delta Nt(ti) + Kd(\Delta Nt(tn) - \Delta Nt(tn-1)) \quad (6)$$

Here, tn, tn–1, Kp, Ki and Kd have the same meanings as in the above-mentioned Exp. (4). This feedback calculation also may consist of PD, PI or P only, or may be based on another control theory.

When at step 400 it is determined that feedback control is to be ended, Flag 1 and Flag 2 are reset (set to 0) at step 420, and the present processing routine ends.

In this preferred embodiment, the method for calculating the compensation hydraulic pressure DFB(tn) for feedback control is different between when torque-reducing control can be executed and when torque-reducing control cannot be executed. However, an alternative method may be adopted wherein a target gradient Δntr of feedback control is set so that it is smaller when torque reduction is impossible, with the method for calculating DFB(tn) not being changed.

Also, with the above method, when torque reduction is impossible, the clutch engagement speed is made to be gradual to suppress shift shock, but when the heat capacity of the clutch is small and the inertia phase time cannot be extended, shift shock may be permissible, and control based on the same target gradient Δntr and compensation hydraulic pressure DFB(tn) may be used irrespective of whether or not there is torque reduction.

[3] Next, standby control of gear change transition control of the above-mentioned step 250 will be described on the basis of FIG. 5.

This control processing resets initial values of inertia phase control every time the predetermined determination interval t0 elapses, until it is determined that the inertia phase is progressing.

At step 500 of FIG. 5, because it has been determined at step 220 of FIG. 3 that the inertia phase is not progressing, to start inertia phase control from the time of that determination, initial values of the inertia phase control are set. That is, as an initial value for implementing inertia phase control, the actual input shaft speed Nt is designated as the target input shaft speed Ntr.

At step 510, the sum of the initial hydraulic pressure Pi for gear changing and a value obtained by multiplying the feedback compensation hydraulic pressure DFB(tn) by a coefficient K is designated as a new initial hydraulic pressure Pi.

Here, K is in the range $1/2 \leq K \leq 1$ and has a value that decreases as the determination interval Δt0 increases. The feedback compensation hydraulic pressure DFB(tn) is a value obtained using the above-mentioned Exp. (6) and is the feedback compensation hydraulic pressure DFB(tn) at time tn (t1, t2, t3 . . . ).

At step 520, the line pressure is set to the initial hydraulic pressure Pi.

At step 530, the counter n is reset to 0, after which the present processing routine ends.

Figure 9A:
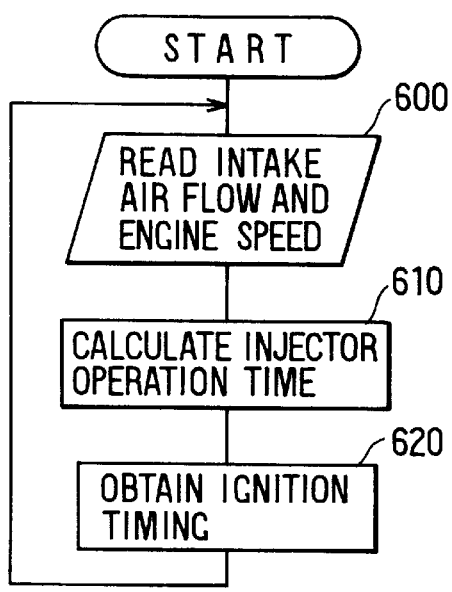
FIGS. 9A and 9B are flow diagrams showing control processing executed by an engine control computer, FIG. 9A being a flow diagram of control executed in a main routine and FIG. 9B a flow diagram of control executed in an interrupt routine.

(ii) Next, processing executed by the engine control computer 5 will be described with reference to FIGS. 9A and 9B.

At step 600, intake air flow and engine speed are read. Also, a value proportional to the intake air flow a fuel injection quantity, that is, a time for which injectors are to be operated, is calculated (step 610). Then, ignition timing is obtained as a function of the engine speed (step 620). The ignition timing is obtained as a spark advance angle of the engine crankshaft corresponding to a flame propagation time determined by cylinder size.

The computation described above is executed repeatedly for the timing of each fuel injection and the timing of each ignition.

Figure 9B:
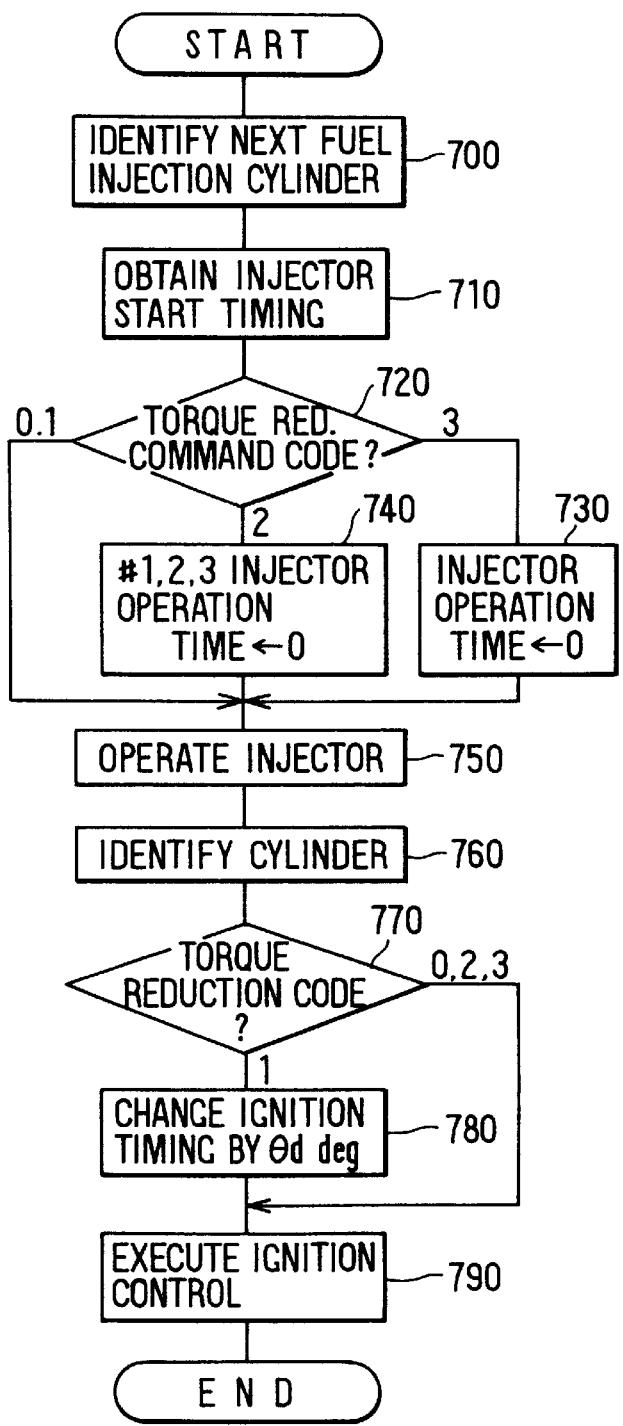

The routine shown in FIG. 9B, on the other hand, is started, as interrupt processing synchronized with the rotation of the engine, every 120° (in the case of a six-cylinder engine) of rotation of the engine crankshaft.

In this routine, first, identification of the next fuel injection cylinder is executed (step 700). In the case of the in-line six-cylinder engine of the present embodiment, if the cylinders are numbered #1, #2, . . . #6 from the front end of the engine, fuel injection is executed in the order of #1, #5, #3, #6, #2, #4. In this order, the number of the cylinder whose intake stroke is just about to start is selected from the rotational position of the crankshaft.

Next, the timing at which the injector is to start being operated is obtained so that the injector operation time obtained in the main routine ends by a predetermined angular position of the crankshaft (step 710).

Then, it is determined which of the numbers 0 to 3 has been received from the transmission control computer 14 as a torque reduction command code (step 720). The torque reduction command code is determined at step 310 (FIG. 4), and is transmitted to the engine control computer 5 at step 340. When no command code is received, at step 720 it is determined that the command code is 0.

When it is determined that the command code is 3, because it is necessary for the fuel to all the cylinders to be cut, the present fuel injection quantity, that is, the injector operation time, is set to zero (step 730). When it is determined that command code=2, the fuel to ½ of the cylinders (in this preferred embodiment, three of the cylinders) must be cut. When the next fuel injection cylinder is #1, #2 or #3, the fuel injection quantity, i.e. the injector operation time, is set to zero. When the next fuel injection cylinder is #4, #5 or #6, the fuel injection quantity is left at the value obtained in the main routine (step 740).

When the command code is 0 or 1, the injector operation time control is not executed.

After a change in the injector operation time has been executed in correspondence with the command code, the injector is operated (step 750). Operation of the injector of the cylinder identified as the next fuel injection cylinder is initiated. After the set operation time elapses, the operation is ended by a microcomputer I/O device timer function.

Next, the next cylinder to be ignited is identified from the rotational position of the engine crankshaft (step 760). It is then determined from the command code whether or not an ignition delay is demanded (step 770). Only when the command code is 1, corresponding to a demand for ignition delay, processing proceeds to step 780. When the command code is not 1, processing proceeds directly to step 790. At step 780, the ignition timing obtained in the main routine is changed through a predetermined value Θd degrees to the delay side.

Finally, ignition control is executed (step 790). Specifically, current is passed through the igniter so that ignition is executed with the set ignition timing, and an end timer built into the microcomputer is started. When the end timer reaches a predetermined timer the current is stopped. Thus, the igniter is operated for a predetermined time for ignition purposes.

c) Next, the operation of the present embodiment under the control processing described above, and the method for determining the progression of the inertia phase, will be described with reference to FIGS. 10A and 10B.

Figure 10A:
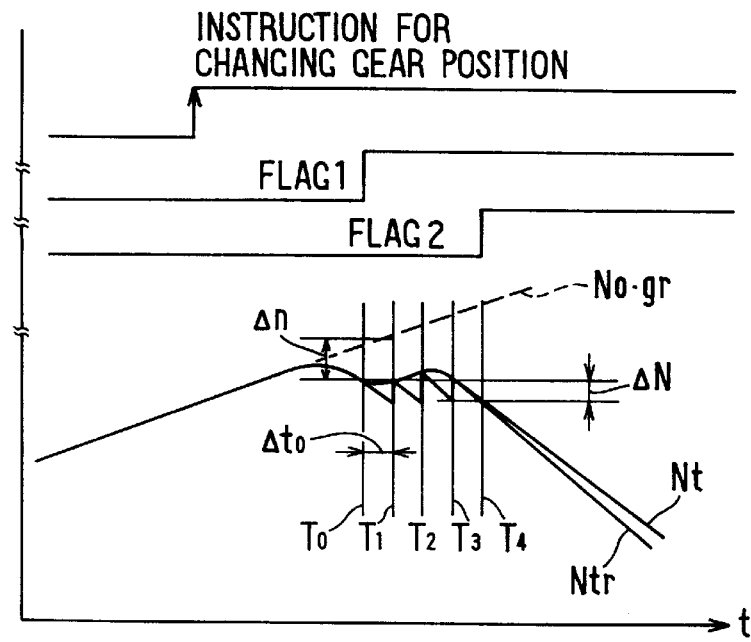
FIGS. 10A and 10B are timing diagrams showing gear change transition states of the first preferred embodiment.
Figure 10B:
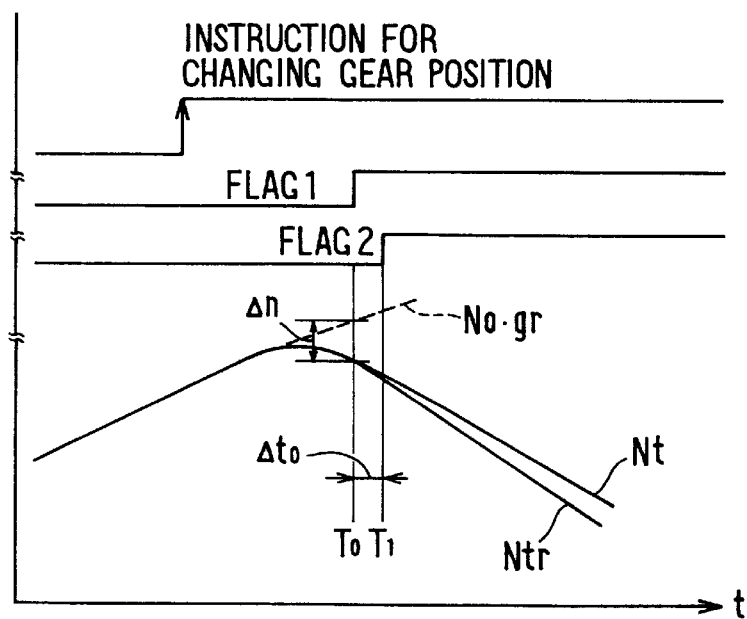

FIG. 10A illustrates bounding in the input shaft speed Nt, and FIG. 10B illustrates a case in which bounding does not occur.

[1] When a gear change command is issued, the input shaft speed Nt starts to fall along with the bounding phenomenon described above. When, as a result of this fall in the input shaft speed Nt, the starting condition of inertia phase control of the above-mentioned Exp. (2) is satisfied, the start of the inertia phase is inferred and simultaneously Flag 1 is set at that time T0 (steps 160, 170).

Then, at time T1, after the predetermined determination interval t0 has elapsed, the target input shaft speed Ntr set in the previous computation period (at time T0) and the actual input shaft speed Nt are compared. When the difference between the two is not greater than the determination value ΔN (i.e. when the above-mentioned Exp. (5) is satisfied) it is inferred that an inertia phase is progressing. In other words, as a result of inertia phase control, the difference between the target input shaft speed Ntr and the actual input shaft speed Nt is within a desirable range, and it is inferred that the same inertia phase control may be continued unchanged. When on the other hand the difference is greater than the determination value ΔN, it is inferred that an inertia phase is not progressing (step 220).

In the case shown in FIG. 10A, at time T1, because Nt−Ntr>ΔN, it is inferred that the progression of the inertia phase has not started, and processing proceeds to gear change transition control standby control (step 250).

In this standby control, the target input shaft speed Ntr is returned to the actual input shaft speed Nt. That is, at the time T1, the initial value of inertia phase control becomes the actual input shaft speed Nt and then inertia phase control is again resumed.

At this time, for example, when the determination interval Δt0 is set to be a relatively long interval, the compensation quantity of feedback control is large, so processing to return the amount of compensation to about ½ is also simultaneously executed. This is because the straight return of the amount of compensation hydraulic pressure to the previous value causes shift shock.

At time T3, Exp. (5) is not satisfied, the processing of steps 210, 220 and 250 is repeated.

Then, supposing that at time T4 for the first time the relationship of Exp. (5) is satisfied and the progressing of an inertia phase is detected, Flag 2 is set (step 230), and processing proceeds to the inertia phase control with engine torque control (step 240).

Meanwhile, the counter n used in FIGS. 3–5 is 0 from T0 to T3 (steps 180, 530) and becomes 1 for the first time at time T4 (step 235).

[2] In the case of FIG. 10B, on the other hand, the start of an inertia phase is inferred at time T0 (step 160), and Flag 1 is set (step 170).

Then, because there is no bounding phenomenon, at time T1 after the elapsing of the first predetermined determination interval Δt0, the relationship of Exp. (5) is satisfied. Accordingly, Flag 2 is set (step 230), and processing proceeds to step 240.

Here the time interval Δt0 is set as the time required for from one to several executions of the control program shown in FIG. 3, and specifically is set to an interval of about 10 to 100 msec. This value is set depending on the performance of the input shaft speed sensor 17. In the present embodiment, the time interval Δt0 is set to the time for one execution of the control program.

Thus, in the present embodiment, when it has been determined on the basis of the input shaft speed Nt that an inertia phase has started (the starting point for inertia phase control has been reached) after a gear change command issues, after a determination interval Δt0 elapses, a determination of whether or not to continue inertia phase control is executed. That is, it is determined whether or not an inertia phase is progressing based on a determination of whether or not the difference between a target input shaft speed Ntr and the actual input shaft speed Nt is equal to or less than a determination value ΔN.

By this means, even when the above-mentioned phenomenon of bounding of the input shaft speed Nt occurs during a gear change transition, incorrect determination of the starting point for inertia phase control can be prevented. Also, there is no delaying of the detection of the starting point for inertia phase control.

When it is judged that an inertia phase is progressing, inertia phase control is continued and, as necessary, torque-reducing control is implemented. By this determination of the need for torque-reducing control and the implementation thereof, the inertia torque can be reduced and the actual input shaft speed Nt can be made to approach the target input shaft speed Ntr as closely as possible, and large shift shocks can thereby be prevented.

When on the other hand it is judged that an inertia phase is not progressing, the same determination of inertia phase progression is executed again after another determination interval Δt0 elapses. By this means it is possible to respond to a change of the actual input shaft speed Nt and thereby prevent incorrect determination and erroneous control based thereon.

Also, because the target input shaft speed Ntr is set to the value of the present input shaft speed Nt and the same inertia phase control is resumed with that value as a starting point when it is determined that an inertia phase is not progressing, in the subsequent control there is no risk of control being executed wherein Nt differs greatly from Ntr.

In the present embodiment, when the determination of whether or not an inertia phase is progressing is executed in the above-mentioned step 220, because the difference between the actual input shaft speed Nt and a target input shaft speed Ntr is used, the determination of the progression of an inertia phase is made looking at the state of whether or not an effect of inertia phase control (feedback control) has been obtained. Consequently, the progression determination can be made accurately.

Second Preferred Embodiment

A second preferred embodiment will now be described, but the description of identical parts of the first preferred embodiment will be omitted or simplified.

In the second embodiment, differently from in the first preferred embodiment, after the starting point of inertia phase control is detected, feedback control making the actual input shaft speed gradient dNt follow up a target input shaft speed gradient dNtr is executed.

Then, after a determination interval t0 from the start of this feedback control, a determination of the progression of the inertia phase is executed. In the first preferred embodiment, at step 220 of FIG. 3, a determination of the progression of an inertia phase was executed using the above-mentioned Exp. (5) showing the relationship between the actual input shaft speed Nt and a target input shaft speed Ntr. In the present embodiment, however, this determination is executed on the basis of whether or not the relationship of the following Exp. (7) is satisfied.

$$dNt-dNtr \leq \Delta dN \tag{7}$$

Figure 11:
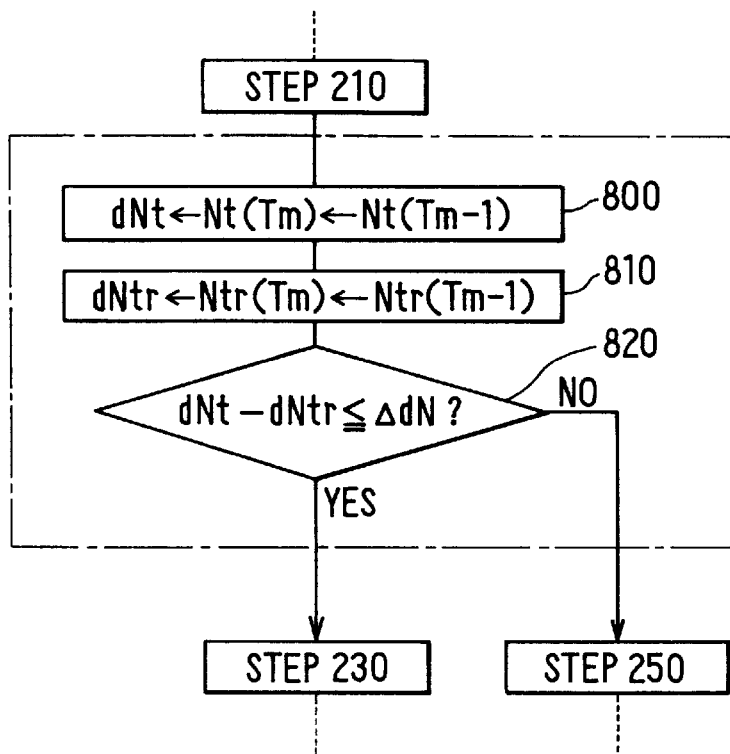
FIG. 11 is a flow diagram showing control processing of a second preferred embodiment.

That is, the actual input shaft speed gradient dNt and a target input shaft speed gradient dNtr are compared, and it is determined whether or not the difference between the two is equal to or less than a determination value ΔdN. If the difference is equal to or less than ΔdN it is inferred that an inertia phase is progressing.

a) Control processing based on Exp. (7) will now be described on the basis of the flow diagram of FIG. 11.

The control processing of the present embodiment is largely the same as that in FIG. 3, but instead of step 220, the following control processing is executed.

First, at step 800, an input shaft speed gradient dNt is obtained from the difference between the input shaft speed Nt(Tm) at time Tm and the input shaft speed Nt(Tm−1) at time Tm−1. Here, Tm is the mth time from when the start of the inertia phase was first detected at step 160.

At step 810, a target input shaft speed gradient dNtr is obtained from the difference between the target input shaft speed Ntr(Tm) at time Tm and the target input shaft speed Ntr(Tm−1) at time Tm−1.

At step 820, it is determined whether or not the difference between the input shaft speed gradient dNt and the target input shaft speed gradient dNtr is equal to or less than a predetermined determination value ΔdN. When a positive determination is made, it is inferred that an inertia phase is progressing and control for during an inertia phase is executed in the same way as in the above-mentioned steps 230 and 240. When, on the other hand a negative determination is made, it is inferred that an inertia phase is not progressing, and standby control of gear change transition control is executed as in step 250.

b) Next, the operation of the present embodiment will be described on the basis of FIG. 12.

When a gear change command is issued, the input shaft speed Nt starts to fall along with the above-mentioned bounding phenomenon. When, as a result, the starting condition of inertia phase control of the above-mentioned Exp. (2) is satisfied, it is determined that an inertia phase has started and Flag 1 is set at time T0.

Subsequently, at time T1, after a predetermined determination interval Δt0 elapses, the target input shaft speed gradient dNtr(T1) and the actual input shaft speed gradient dNt(T1) are compared. When the difference between the two is not greater than the predetermined determination value ΔdN (when Exp. (7) is satisfied) it is determined that an inertia phase is progressing. When on the other hand the difference exceeds the determination value ΔN, it is determined that an inertia phase is not progressing (step 820).

Figure 12:
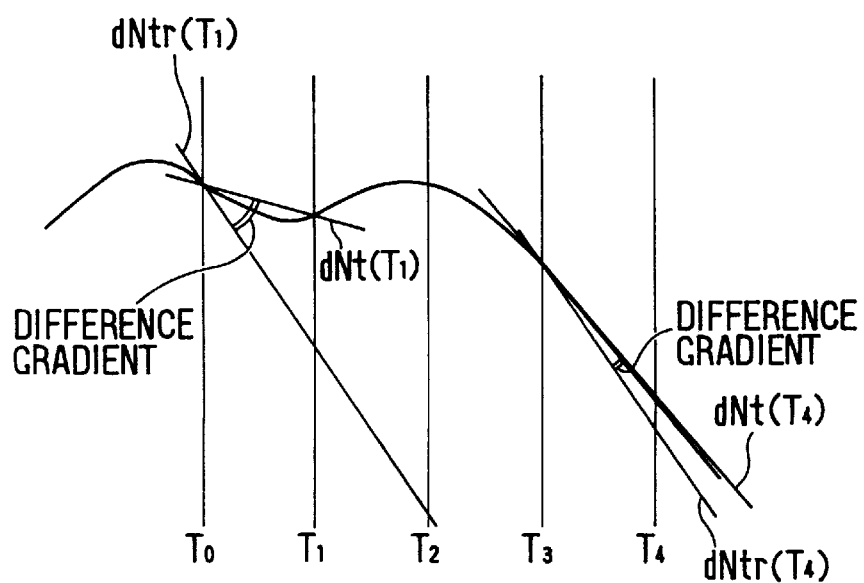
FIG. 12 is a timing diagram showing gear change transition state of the second preferred embodiment.

As shown in FIG. 12, from time T1 to time T3, because Nt−Ntr≧ΔN, processing infers that progression of an inertia phase has not started, and thus proceeds to standby control for gear change transition control (step 250).

At time T4, for the first time, the relationship of Exp. (7) is satisfied, and it is inferred that the progression of an inertia phase has been detected. Processing then proceeds to subsequent inertia phase control with torque-reducing control (steps 230, 240).

In this way, in the present embodiment, when it is determined on the basis of the input shaft speed Nt that an inertia phase has started after a gear change command, control that causes the input shaft speed gradient dNt to follow the target input shaft speed gradient dNtr is executed. Then, after the determination interval Δt0 elapses, a determination of whether or not to continue inertia phase control is executed. In other words, it is determined whether or not an inertia phase is progressing by determining whether or not the difference between the target input shaft speed gradient dNtr and the actual input shaft speed gradient dNt is equal to or less than the determination value dN.

Thus, it is possible to carry out an accurate determination and thereby effect precise control because determination of the progression of the inertia phase is executed using not the input shaft speed Nt but rather the input shaft speed gradient dNt. Therefore, it is likely to accord better to change in the actual input shaft speed Nt, that is, to change of the inertia phase.

Third Preferred Embodiment

A third preferred embodiment will now be described, with the description of parts identical to those in the first preferred embodiment being omitted or simplified.

In the present embodiment, after the starting point for inertia phase control is detected, as in the first preferred embodiment, feedback control causing the actual input shaft speed Nt to follow a target input shaft speed Ntr is executed.

Figure 13:
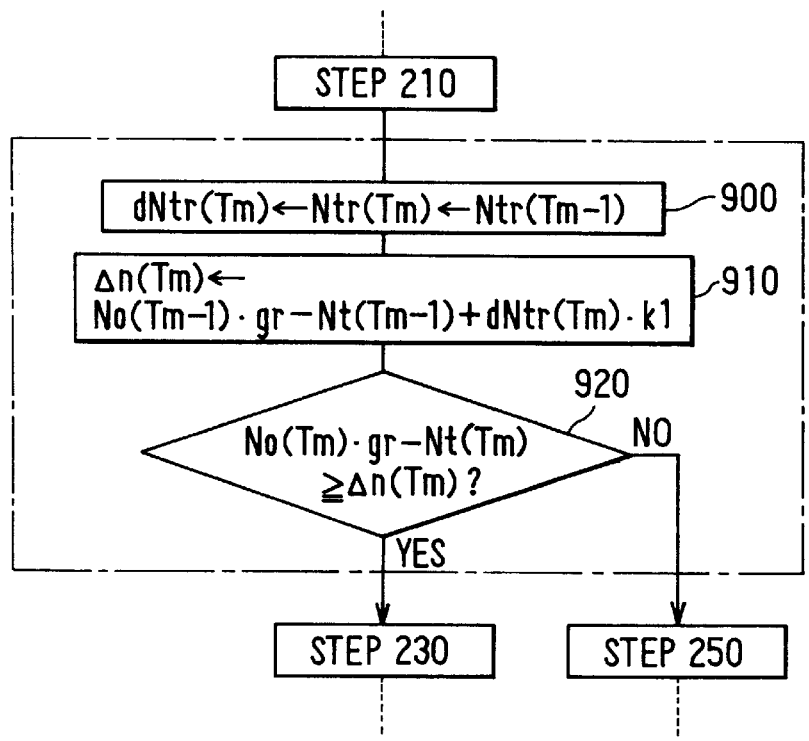
FIG. 13 is a flow diagram showing control processing of a third preferred embodiment.

After a determination interval t0 following the start of the feedback control, a determination of progression of the inertia phase is executed. However, in this preferred embodiment, the progression of the inertia phase is determined on the basis of a value of input shaft speed predicted with the supposition being made that feedback control is proceeding in an ideal manner.

a) First, control processing of the present embodiment will be described with reference to the flow diagram of FIG. 13.

The control processing in the present embodiment is largely the same as the control processing shown in FIG. 3. However, instead of step 220, the following control processing step is executed.

First, at a step 900, a target input shaft speed gradient dNtr(Tm) at time Tm is obtained from the difference between the target input shaft speed Ntr(Tm) at time Tm and the target input shaft speed Ntr(Tm−1) at time Tm−1.

At step 910, the input shaft speed Nt(Tm−1) at time Tm−1 is subtracted from the product of the output shaft speed No at time Tm−1 and the gear ratio gr. From the sum of this result, and the product of the target input shaft speed gradient dNtr(Tm) and a coefficient k1, a determination value Δn(Tm) at time Tm is obtained.

At step 920, a determination is made based on whether or not the relationship of the following Exp. (8) is satisfied.

$$No(Tm) \cdot gr - Nt(Tm) \geq \Delta n(Tm) \qquad (8)$$

That is, it is determined whether or not the value obtained by subtracting the input shaft speed Nt(Tm) at time Tm from the product of the output shaft speed No at time Tm and the gear ratio gr is equal to or greater than the determination value Δn(Tm). When a positive determination is made, it is inferred that an inertia phase is progressing, and control for during inertia phase progression is executed in the same way as in the above-mentioned steps 230 and 240. When on the other hand a negative determination is made, it is inferred that an inertia phase is not progressing, and standby control of gear change transition control is executed in the same way as in the above-mentioned step 250.

Next, the operation of the present embodiment under the control processing described above and the principle thereof will be explained with reference to FIGS. 14A and 14B.

Figure 14A:
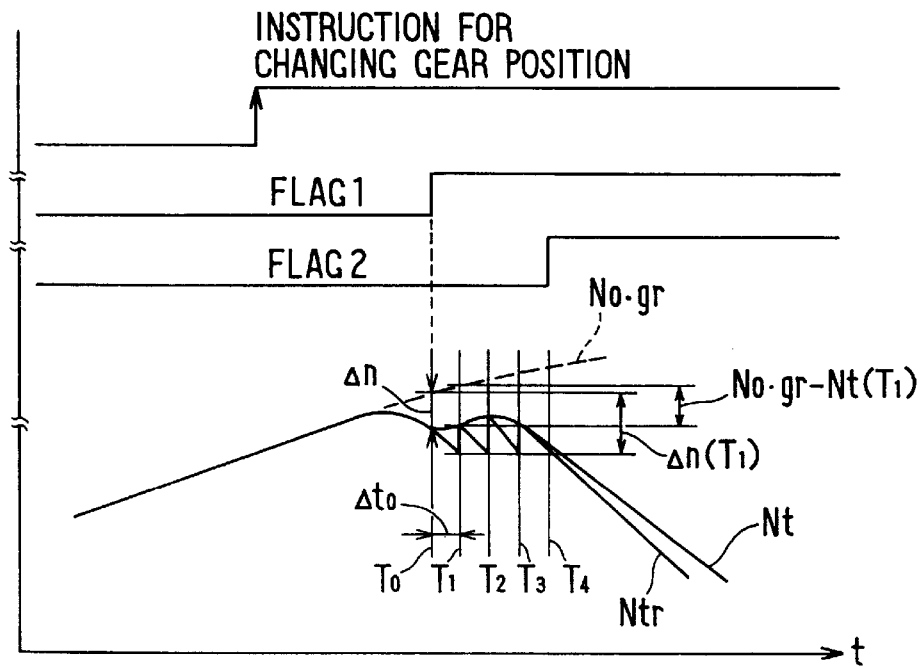
FIGS. 14A and 14B are timing diagram showing gear change transition states of the third preferred embodiment.
Figure 14B:
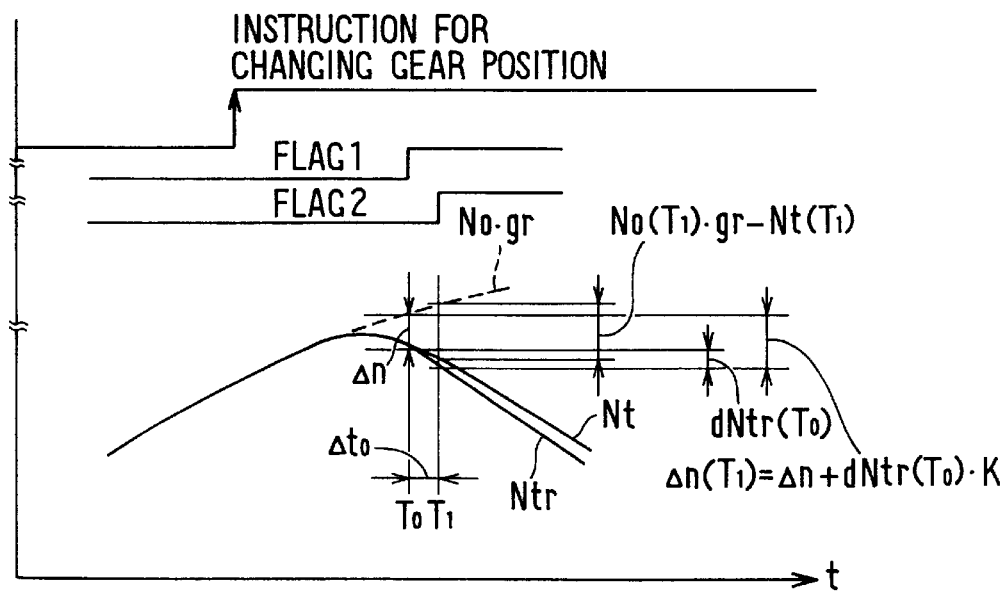

FIG. 14A shows a case wherein there is bounding, and FIG. 14B shows a case wherein there is no bounding.

First, as shown in FIG. 14B, for example, at time T1, a determination of inertia phase progression is executed on the basis of whether or not the following Exp. (9), obtained by substituting values at T1 in the above-mentioned Exp. (8), is satisfied.

$$No(T1) \cdot gr - Nt(T1) \geq \Delta n(T1) \qquad (9)$$

Here, Δn(T1) is obtained from the following Exp. (10).

$$\Delta n(T1) = \Delta n + dNtr(T0) \cdot k1 \qquad (10)$$

That is, Δn(T1) is obtained by adding the target input shaft speed gradient dNtr(T0) set at time T0 multiplied by k1 (a constant set in the range 1 to 1/2 for considering sensor performance) to the determination value Δn at time T0.

Thus, assuming the inertia phase started at time T0, the input shaft speed Nt would be expected to fall along with the target input shaft speed Ntr set at that time. Consequently, at time T1 the value of the input shaft speed Nt(T1) can be expected to be in the vicinity of the point below the value of No(T1)·gr by Δn(T1) when k1=1 in Exp. (10).

More particularly, this is preferably the point representing a further decrease by an amount corresponding to the acceleration of the vehicle during the determination interval Δt0, i.e. (No(T1)−No(T0))·gr.

In practice, because a follow-up error arises, for the calculation of the determination value of Exp. (10), a compensation coefficient k for taking into account that error is applied.

In this way, it is possible to determine the progression of an inertia phase at time T1 when as in FIG. 14B there is no bound in the input shaft speed change.

However, when as shown in FIG. 14A a bound arises, compared to FIG. 14B for as long as no sufficient fall of the input shaft speed Nt appears, the determination of Exp. (9) is not established.

When the determination of Exp. (9) is not established, the lowering of the target input shaft speed Ntr is stopped. At time T1, Ntr(T1) is reset to Nt(T1) and a target input shaft speed gradient dNtr(T1) is set.

Then, the determination value Δn(T2) at time T2 is obtained not from the above-mentioned Exp. (10) but from the following Exp. (11).

$$\Delta n(T2)=No(T1)\cdot gr - Nt(T1)+dNtr(T1) \quad (11)$$

Thereafter, until the determination is established, the determination value Δn(Tm+1) at time Tm+1 is obtained from the following Exp. (12), which is a general formula.

$$\Delta n(Tm+1)=No(Tm)\cdot gr - Nt(Tm)+dNtr(Tm) \quad (12)$$

That is, by m=1, 2, 3 . . . , the determination value Δn is updated at intervals of the calculation time. Using this determination value Δn, a determination is repeated according to the above-mentioned Exp. (8).

In FIG. 14A, at time T4, the determination of Exp. (8) is established.

In this way, in the present embodiment, after the elapsing of the determination interval Δt0 from the determination of the start of an inertia phase, in determining the progression of the inertia phase, a determination value Δn obtained from Exp. (12) is used and the determination is made by means of Exp. (8). In other words, the progression of the inertia phase is determined based on a value of input shaft speed estimated, with it being assumed that feedback control is ideally proceeding.

Therefore, an accurate determination of inertia phase progression can be made by this means, as well as the same effects as of the first preferred embodiment being obtained, because the determination is one based on the effect of the execution of inertia phase control.

Fourth Preferred Embodiment

Next, a fourth preferred embodiment will be described, again with the description of parts identical to those in the first preferred embodiment being omitted or simplified.

In this preferred embodiment, after the starting point for inertia phase control is detected, as in the first preferred embodiment, feedback control making the actual input shaft speed Nt follow up a target input shaft speed Ntr is executed.

Figure 15:
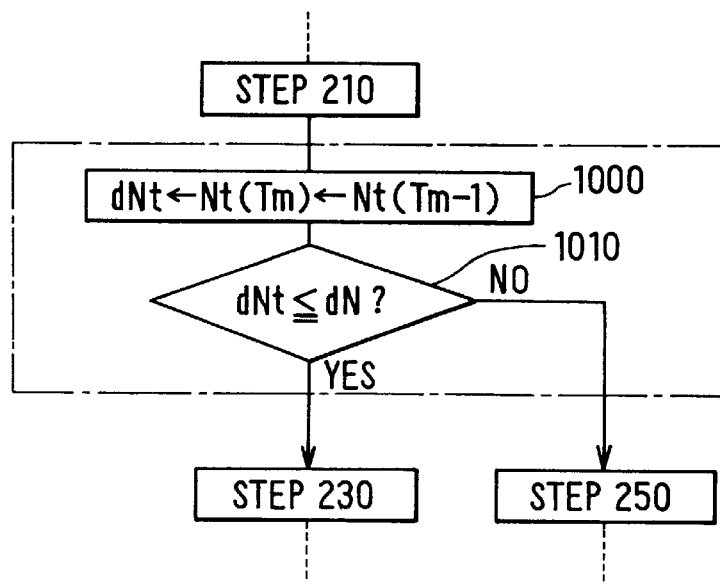
FIG. 15 is a flow diagram of control processing of a fourth preferred embodiment.

Then, after a determination interval Δt0 elapses from the start of feedback control, a determination of progression of the inertia phase is executed. However, in this preferred embodiment, the determination of inertia phase progression is executed based on whether or not the change in the actual input shaft speed Nt has reached a predetermined value (a determination value dN indicating a gradient).

a) First, control processing of this preferred embodiment will be described on the basis of the flow diagram of FIG. 15.

The control processing in this embodiment is largely the same as that in FIG. 3, but instead of the step 220 the following control processing is executed.

First, at step 1000, an input shaft speed gradient dNt is obtained from the difference between the input shaft speed Nt(Tm) at time Tm and the input shaft speed Nt (Tm−1) at time Tm−1.

Then, at step 1010, it is determined whether or not the relationship of the following Exp. (13) is satisfied.

$$dNt \leq dN \quad (13)$$

That is, it is determined whether or not the input shaft speed gradient dNt is equal to or lower than a predetermined gradient dN. When a positive determination is made, it is inferred that the inertia phase is progressing and control for during inertia phase progression is executed in the same way as at steps 230 and 240. When on the other hand a negative determination is made, it is inferred that the inertia phase is not progressing, and standby control of gear change transition control is executed in the same way as at step 250.

b) Next, the operation of this preferred embodiment under the control processing described above and the principle thereof will be described on the basis of FIGS. 16A and 16B.

Figure 16A:
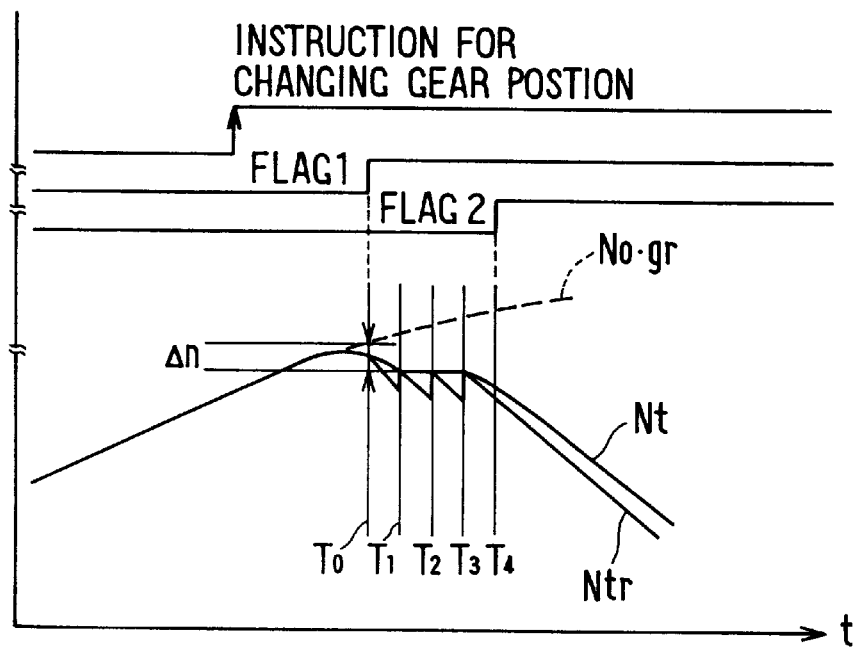
FIGS. 16A and 16B are timing diagrams showing gear change transition states of the fourth preferred embodiment.
Figure 16B:
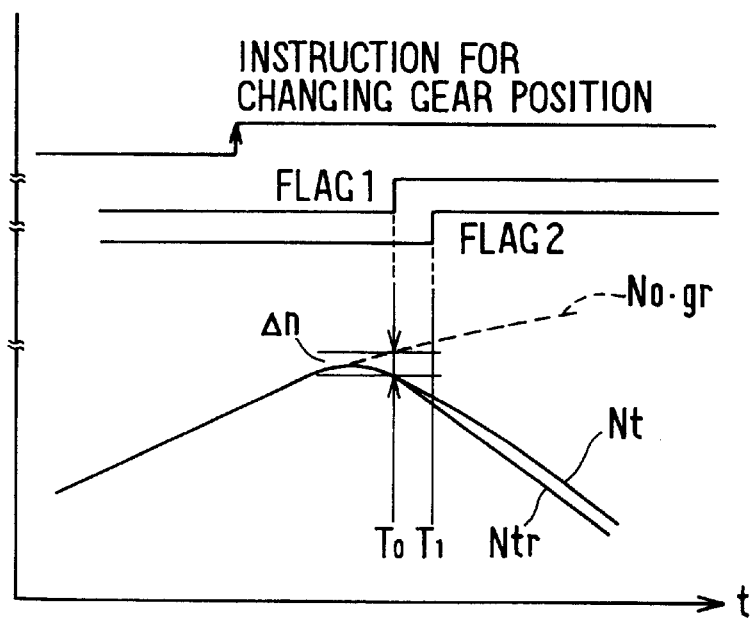
Figure 17A:
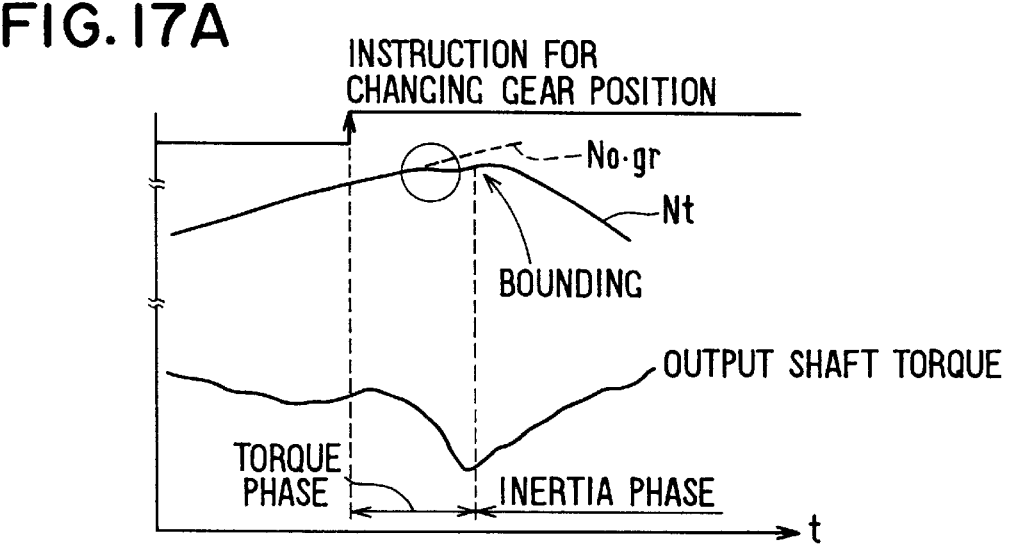
FIGS. 17A, 17B and 17C show related art technology, FIG. 17A being a timing diagram showing a gear change transition state resulting from change in a coefficient of friction, FIG. 17B a view showing change in a coefficient of friction, and FIG. 17C a timing diagram showing a gear change transition state resulting from return of an accelerator pedal.
Figure 17B:
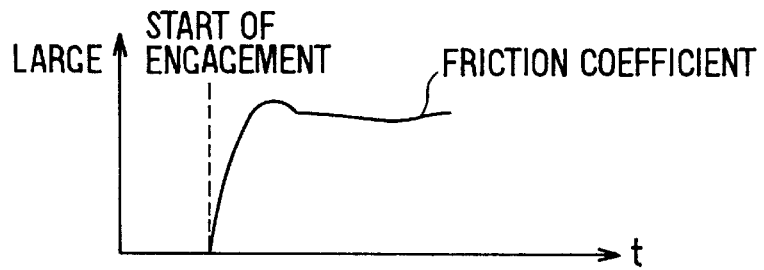
Figure 17C:
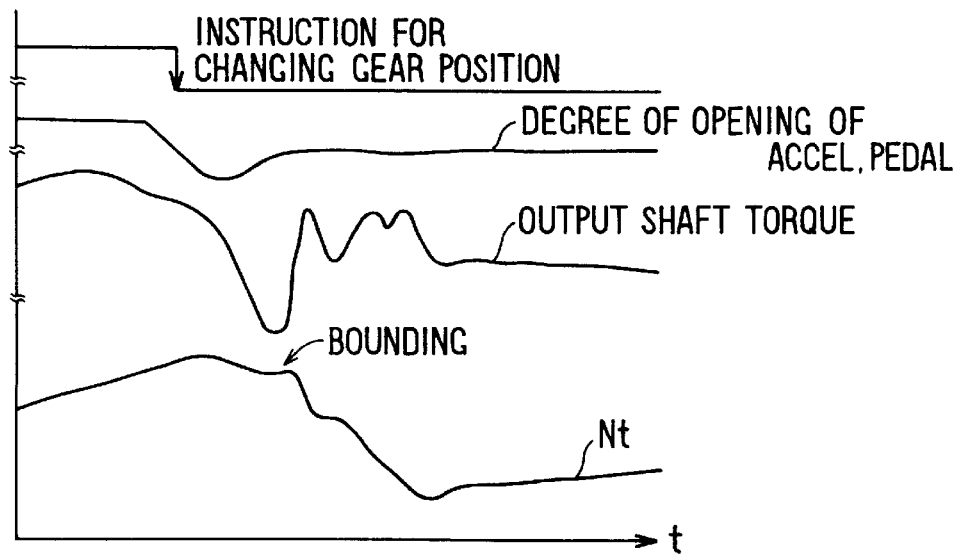

FIG. 16A shows a case in which bounding occurs, and FIG. 16B shows a base in which bounding does not occur.

As shown in FIG. 16A, at each of the times T1 through T4, the respective input shaft speed gradient dNt is compared with the predetermined determination value dN (a constant). In this case, at each of the times T1 through T3, because the Exp. (13) is not satisfied, it is determined that the inertia phase is not progressing, and an initial value for feedback control is determined, the input shaft speed Nt at that time and feedback control is executed. Then, at time T4, because Exp. (13) is satisfied, it is determined that the inertia phase is progressing, and feedback control is continued.

When no bounding occurs, as in FIG. 16B, because Exp. (13) is held at time T1, feedback control is continued.

In this way, in this embodiment, the progression of an inertia phase is determined on the basis of whether or not the actual input shaft speed gradient dNt has reached a certain fixed value dN. Computation is thus simplified, as Exp. (13) is used to determine inertia phase progression.

The present invention is not limited to the preferred embodiments described above and can of course be practiced in various forms without deviating from the technological scope of the claims. For example:

(1) In the preferred embodiments described above, when the progression of an inertia phase is determined, inertia phase control, for example feedback control of a line pressure making the actual input shaft speed Nt (or its gradient) traces a target input shaft speed Ntr (or gradient thereof) set to end the inertia phase within a predetermined time was executed. However, feedback control of clutch pressure may alternatively be executed.

(2) In the second through fourth preferred embodiments described above, engine torque-reducing control under high input torque running conditions may be executed, as in the first preferred embodiment.

(3) In the first through fourth preferred embodiments, a control apparatus of an automatic transmission was described, but a storing medium for executing the control of such an apparatus is also included in the invention.

The storing medium may be of any of various types, and may for example be an electronic control unit constructed as a microcomputer, microchip, floppy disc, hard disc, optical disc, or any storing medium including a program to control any one of the above embodiments.

Various other advantages of the present invention will become apparent to those skilled in the art after having the benefit of studying the foregoing text and drawings taken in conjunction with the following claims.

What is claimed is:

1. An automatic transmission control apparatus for executing inertia phase control to feedback-control a working fluid pressure of the frictional element in an inertia phase, wherein an input shaft speed of a speed-changing gear mechanism changes upon engagement of a frictional element of the speed-changing gear mechanism, the control apparatus comprising:

starting point determining means for determining a starting point for the inertia phase control;

control starting means for starting the inertia phase control when the starting point determining means determines that a starting point for the inertia phase control has been reached; and continuation determining means for determining whether to continue the inertia phase control after a predetermined determination interval from when the inertia phase control is started by the control starting means elapses.

2. The apparatus of claim 1, wherein the starting point determining means determines the starting point for the inertia phase control from the input shaft speed and an output shaft speed of the automatic transmission, and a gear ratio between the input and output shafts prior to gear change.

3. The apparatus of claim 1, wherein starting of torque-reducing control for reducing engine torque is postponed until the continuation determining means determines whether to continue the inertia phase control, and starting of the torque-reducing control is determined based on whether the continuation determining means determines whether to continue the inertia phase control.

4. The apparatus of claim 1, wherein the continuation determining means determines whether to continue the inertia phase control based on progression of the inertia phase.

5. The apparatus of claim 4, wherein the continuation determining means determines whether to continue the inertia phase control based on a difference between a target input shaft speed constituting a target value of the inertia phase control and the actual input shaft speed.

6. The apparatus of claim 4, wherein the continuation determining means determines whether to continue the inertia phase control based on a difference between a target input shaft speed gradient constituting a target value of the inertia phase control and an actual input shaft speed gradient.

7. The apparatus of claim 4, wherein the continuation determining means determines whether to continue the inertia phase control based on a value of the input shaft speed, the value of the input shaft speed being estimated based on ideal progression of the inertia phase control.

8. The apparatus of claim 4, wherein the continuation determining means determines whether to continue the inertia phase control based on a determination of whether an actual input shaft speed gradient has reached a predetermined value.

9. The apparatus of claim 1, wherein the continuation determining means determines whether to continue the inertia phase control each time the determination interval elapses.

10. The apparatus of claim 1, wherein a target value of the inertia phase control is adjusted to a present respective value, and the inertia phase control is subsequently resumed from the adjusted value, when the inertia phase control is suspended as a result of the continuation determining means determining whether to continue the inertia phase control.

11. The apparatus of claim 1, further comprising a storage medium having stored therein the starting point determining means, the control starting means and the continuation determining means.

12. A method for carrying out inertia phase control in an automatic transmission to feedback-control a working fluid pressure of a frictional element in an inertia phase, wherein an input shaft speed of a speed-changing gear mechanism changes with an engaging operation of a frictional element of the speed-changing gear mechanism, comprising the steps of:

determining when a starting point of the inertia phase control has been reached;

initiating the inertia phase control when it is determined that a starting point of the inertia phase control has been reached; and determining whether to continue the inertia phase control after a predetermined determination interval from the start of the inertia phase control has elapsed.

13. The method of claim 12, wherein the step of determining whether to continue is based on a difference between a target input shaft speed constituting a target value of the inertia phase control and an actual input shaft speed.

14. The method of claim 12, wherein the step of determining whether to continue is based on a difference between a target input shaft speed gradient constituting a target value of the inertia phase control and an actual input shaft speed gradient.

15. The method of claim 12, wherein the step of determining whether to continue is based on a value of an estimated input shaft speed, the estimated input shaft speed being based on an ideal progression of the inertia phase control.

16. The method of claim 12, wherein the step of determining whether to continue is based on a determination of whether an actual input shaft speed gradient has reached a predetermined value.

17. A closed-loop feedback controller for an automatic transmission that controls a working fluid pressure of frictional elements in a speed-changing gear mechanism, the controller being operative to start inertia phase control of the working fluid pressure when it determines that a starting point for the inertia phase control has been reached, the controller being further operative to determine whether to continue the inertia phase control after a predetermined determination interval elapses from the starting point of inertia phase control.

* * * * *